(12) United States Patent
Lee

(10) Patent No.: US 6,199,474 B1
(45) Date of Patent: *Mar. 13, 2001

(54) SMOKELESS BARBECUE GRILL

(76) Inventor: Mong-Yu Lee, No. 182, Chienfeng Rd., Kangshan Chen, Kaohsiung Hsien (TW)

(*) Notice: Subject to any disclaimer, the term of this patent is extended or adjusted under 35 U.S.C. 154(b) by 0 days.

This patent is subject to a terminal disclaimer.

(21) Appl. No.: 09/178,811

(22) Filed: Oct. 26, 1998

Related U.S. Application Data

(63) Continuation-in-part of application No. 09/008,208, filed on Jan. 16, 1998, now Pat. No. 5,910,209.

(51) Int. Cl.[7] .............................. A47J 37/00; A47J 37/04; A47J 37/07
(52) U.S. Cl. ................... 99/450; 99/482; 99/516; 126/9 R; 126/25 R
(58) Field of Search ...................... 99/339, 340, 444–446, 99/400, 401, 447, 449, 450, 481, 482, 516, 534; 126/25 R, 299 R, 41 R, 299 D, 9 R, 299 E, 9 B, 39 R, 21 A, 39 G, 25 C; 426/523, 474, 438; 55/436, 440, 467, 472, 509, DIG. 36

(56) References Cited

U.S. PATENT DOCUMENTS 5,910,209 * 6/1999 Lee ........................................ 99/450

* cited by examiner

Primary Examiner—Timothy F. Simone
(74) Attorney, Agent, or Firm—Fredrikson & Byron, P.A.

(57) ABSTRACT

A smokeless barbecue grill includes a tubular frame with a grill received therein and an annular gap defined between the frame and the grill. A plurality of nozzles are located around and below the grill and a divider is located below the nozzles, wherein the divider has a protrusion extending toward the grill with a hole defined therethrough so that water sprayed from the nozzles containing the grease and ash particles drops through the hole. A ventilator is located below the divider to suck air from the frame.

14 Claims, 3 Drawing Sheets

SMOKELESS BARBECUE GRILL

This application is a continuation-in-part of U.S. patent application Ser. No. 09/008,208, filed Jan. 16, 1998, by the same Applicant, and which is now U.S. Pat. No. 5,910,209, dated Jun. 8, 1999, all commonly owned by current Applicant.

FIELD OF THE INVENTION

The present invention relates to a barbecue grill, and more particularly, to a smokeless barbecue grill having a divider with a protrusion extending therefrom, the protrusion having a hole defined therethrough so that grease and carbon particles from the grill are condensed in the water sprayed from nozzles around the grill and will not be sucked into the ventilators located below the divider.

BACKGROUND OF THE INVENTION

A conventional barbecue grill, especially the type used inside of houses, is required to reduce the smoke emanating from coals burning in the grill bed so that ventilators are arranged around the barbecue grill to exhaust the smoke. The ventilators are located in the table with the barbecue grill and are flush with the table so that the smoke is exhausted from the barbecue grill right after it is generated. However, the smoke includes so much grease and ash which attaches to the inside of the pipes in the table and the ground and the fans of the ventilators. The sticky grease and ash narrow the inner diameter of the pipes and reduce efficiency of the ventilators. In addition, after the grill has been used for a period of time, it takes a huge effort to clean the pipes in the ground and the table, and such cleaning process takes several days during which the barbecue grill cannot be used.

The present invention intends to provide a smokeless barbecue grill whose grease and ash are condensed in water sprayed from nozzles around the device, and the water drops through a hole in a divider below which the ventilators are located. Therefore, the air sucked by the ventilators contains very little of the grease and ash.

SUMMARY OF THE INVENTION

In accordance with one aspect of the present invention, there is provided a smokeless barbecue grill comprising a grill received in a tubular frame with gaps defined between the frame and the grill, a plurality of nozzles located below the grill, a divider connected transversely in the frame and located below the nozzles, at least one hole defined through the divider, and at least one ventilator located below the divider.

An object of the present invention is to provide a smokeless barbecue grill wherein the ventilator will not suck the grease and coal particles therein.

Another object of the present invention is to provide a smokeless barbecue grill wherein the divider has a protrusion with a hole defined therethrough, water sprayed from the nozzles drops through the hole when the water level is higher than the protrusion so that the hole is sealed by the water and no air having grease and coal particles may enter through the hole.

Further objects, advantages, and features of the present invention will become apparent from the following detailed description with appropriate reference to the accompanying drawings.

DETAILED DESCRIPTION OF THE PREFERRED EMBODIMENTS

Figure 1:
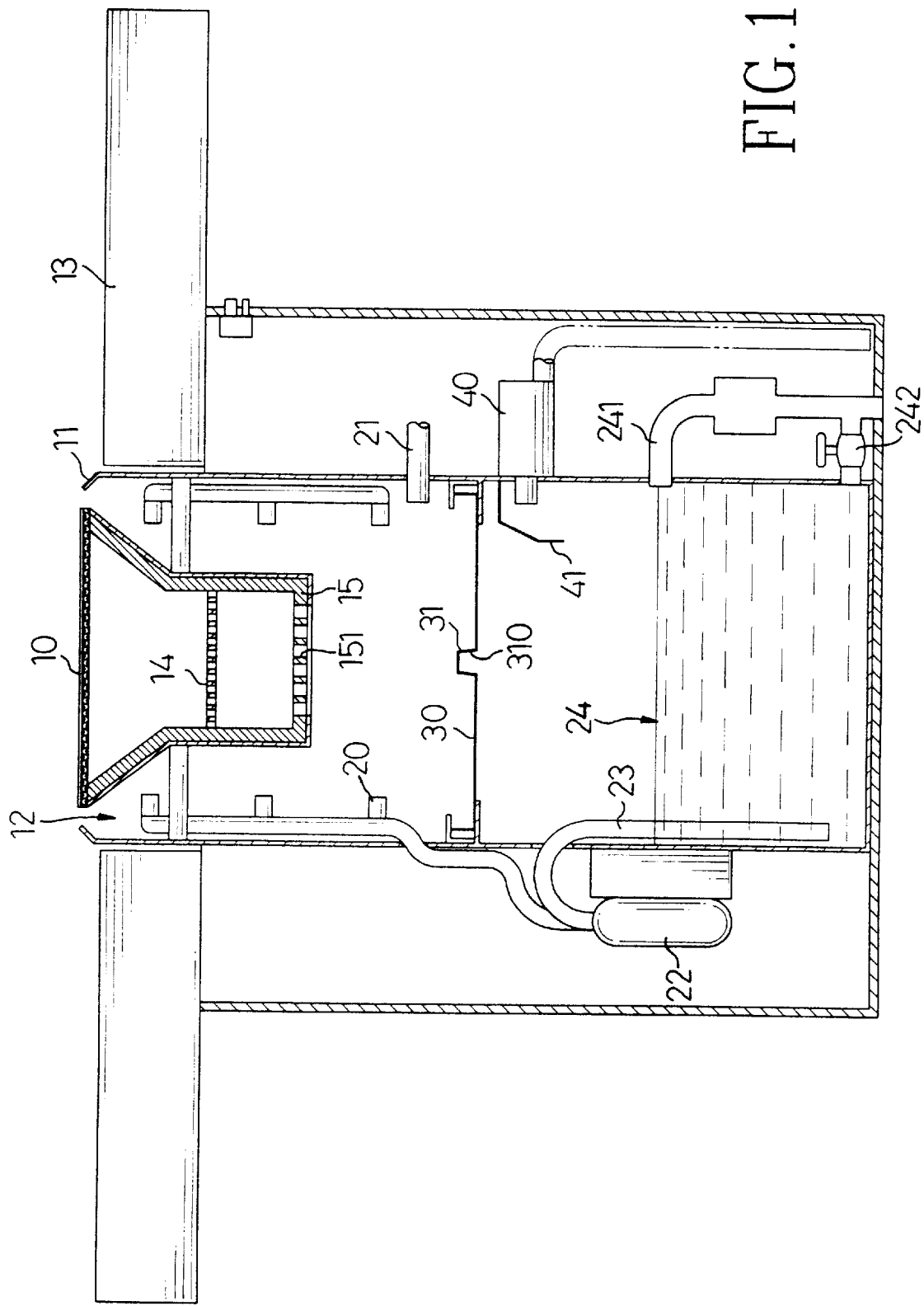
FIG. 1 is a side elevational view, partly in section, of the smokeless barbecue grill in accordance with the present invention.
Figure 2:
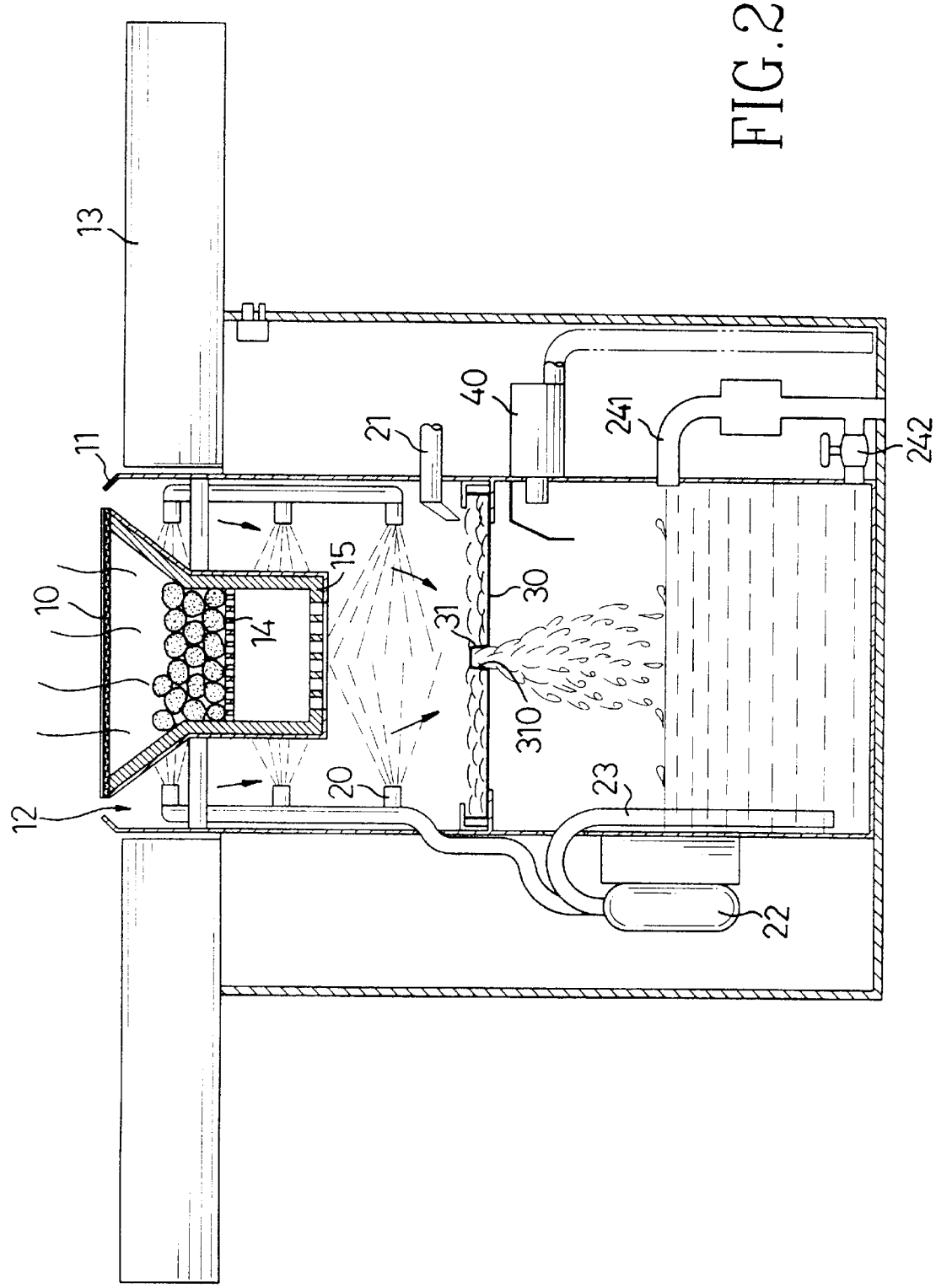
FIG. 2 is a side elevational view, partly in section, of the smokeless barbecue grill of the present invention to illustrate the situation when the barbecue grill is in use.

Referring to FIGS. 1 and 2, a smokeless barbecue grill in accordance with the present invention comprises a grill (10) which is received in a top portion of the tubular frame (11) and the tubular frame (11) is received in a table (13). An annular gap (12) is defined between the frame (11) and the grill (10) so that smoke emanating from the grill (10) can be sucked via the annular gap (12) by the ventilator (40) located below the grill (10) as described below. The grill (10) has a meshed grate (14) to hold coals and a bottom (15) which has apertures (151) defined therethrough so as to provide necessary ventilation. A water-proof coating is adhered to outside of the grill (10).

A plurality of nozzles (20) are located around and below the grill (10) and connected to a pump (22) from which a pipe (23) extends into a water reservoir (24) located at the bottom of the frame (11) so that water is pumped and sprays from the nozzles (20). A divider (30) is connected transversely in the frame (11) and located below the nozzles (20). A protrusion (31) extends upwardly toward the grill (10) and has a hole (310) defined therethrough. A ventilator (40) is located below the divider (30) and has a shield (41) located in front of the ventilator (40).

An inlet pipe (21) is located below the nozzles (20) and above the divider (30) so that water can be supplied into the frame (11) and maintain the water level on the divider (30) slightly higher than the protrusion (31) so that the hole (310) of the protrusion (31) is sealed by the water. An overflow drain pipe (241) communicates with the reservoir (24) so as to maintain the water level in the reservoir (24) at a predetermined height. A drain valve (242) is connected between the overflow drain pipe (241) and the reservoir (24) so as to conveniently drain the water in the reservoir (24) to clean the bottom of the reservoir (24).

When in use, the smoke is sucked via the annular gap (12) and water is sprayed from the nozzles (20) to precipitate the grease and ash. The water level on the divider (30) seals the hole (310) so that the grease and ash in the water drop through the hole (310) into the reservoir (24). Therefore, the air between the divider (30) and the reservoir (24) contains very little grease and ash so that the air sucked into the ventilator (40) is clean. Furthermore, the shield (41) in front of the ventilator (40) prevents water particles from being sucked into the ventilator (40).

Figure 3:
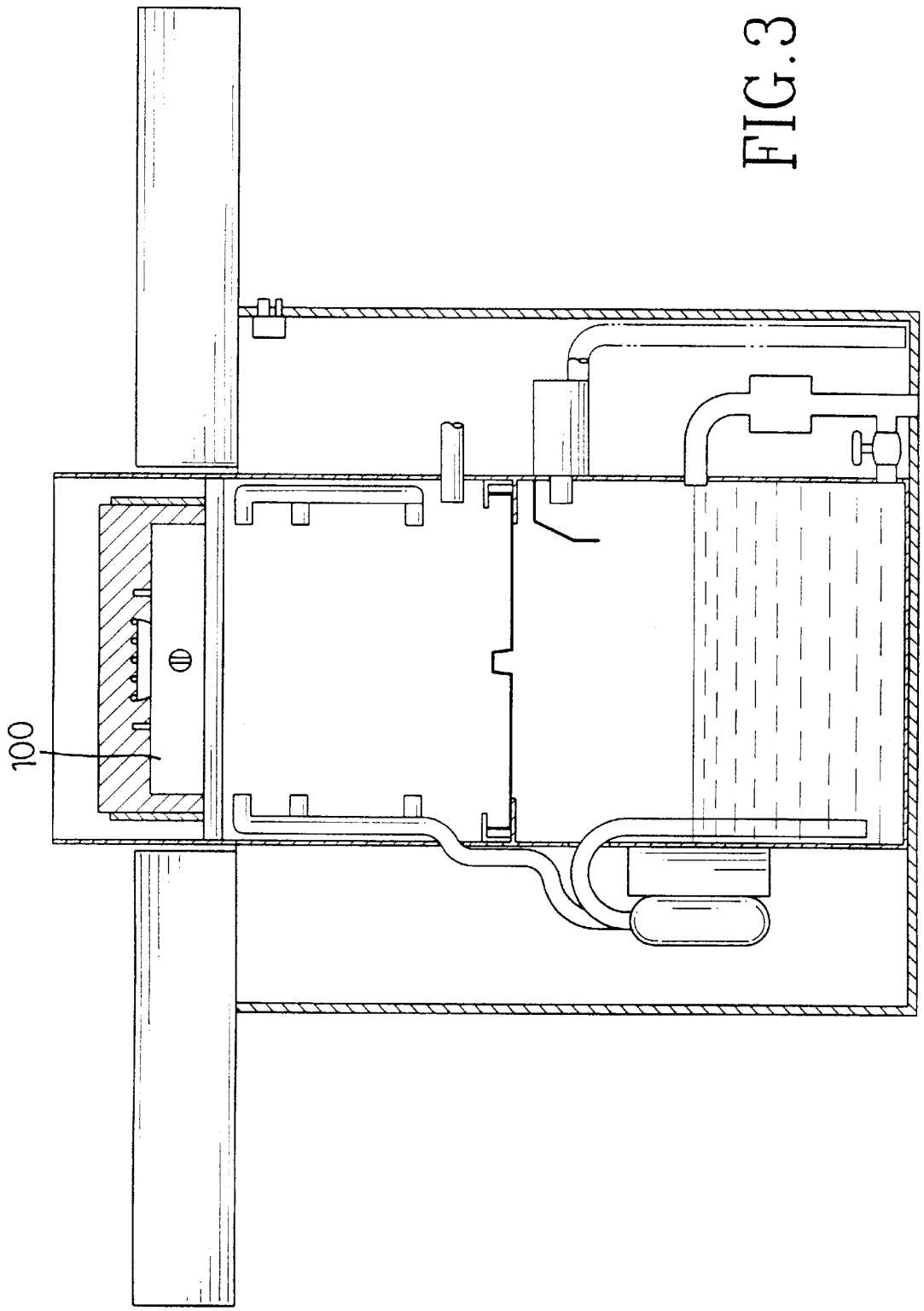
FIG. 3 is a side elevational view, partly in section, of another embodiment of the smokeless barbecue grill in accordance with the present invention.

FIG. 3 shows another embodiment wherein the grill (10) is replaced by a gas stove (100) which is more convenient to use.

Although the invention has been explained in relation to its preferred embodiment, it is to be understood that many other possible modifications and variations can be made without departing from the spirit and scope of the invention as hereinafter claimed.

What is claimed is:

1. A smokeless barbecue grill comprising:
   a grill received in a tubular frame with a gap defined between said frame and said grill;
   a plurality of nozzles located below said grill;

a divider connected transversely in said frame and located below said nozzles, at least one hole defined through said divider, and at least one ventilator located below said divider.

2. The grill as claimed in claim 1, wherein said divider has at least one protrusion extending therefrom through which at least one hole is defined.

3. The grill as claimed in claim 2, wherein said protrusion extends upwardly from said divider and toward said grill.

4. The grill as claimed in claim 1 further comprising an inlet pipe located below said nozzles and above said divider.

5. The grill as claimed in claim 1 further comprising a shield located in front of said ventilator.

6. The grill as claimed in claim 1 further comprising an overflow drain pipe located in the reservoir and a drain pipe and valve located at the bottom of the reservoir and connected to the overflow drain pipe.

7. A smokeless barbecue grill apparatus comprising:

a. a grill for cooking food thereon configured substantially within a top portion of a frame and defining a gap between the grill and the frame so that smoke emanating from the grill during use may be sucked back into the apparatus via the gap;

b. a ventilator having piping associated therewith and positioned at a portion of the frame lower than the grill, wherein the ventilator and associated piping is useful for sucking smoke emanating from the grill through the gap and to a location below the grill;

c. a plurality of nozzles positioned around and below the grill, said nozzles connected to a pump for pumping water through the nozzles and into a region of the device in which the smoke is sucked during operation, and so that the nozzles spray the water onto the smoke to precipitate any particulate from the smoke into the water; and d. a divider configured within the apparatus to collect the water sprayed from the nozzles, said divider being located transversely and between the ventilator and the nozzles, and having at least one hole therethrough to allow the water to pass from the nozzles to a portion of the apparatus beneath the divider, wherein the hole is sized and positioned so that the water having the precipitate of the smoke is allowed to only pass through the hole at a rate which maintains the hole blocked with water during operation of the device thereby isolating the smoke to a location within the device beneath the grill and above the divider.

8. The apparatus of claim 7 in which the divider has at least one protrusion extending therefrom through which the at least one hole is defined.

9. The apparatus of claim 7 in which the portion of the apparatus beneath the divider comprises a water reservoir.

10. The apparatus of claim 9 in which the level of water in the water reservoir is controlled by a drain and overflow piping system.

11. The apparatus of claim 7 in which the gap is either an annular gap, one or more apertures in a bottom portion of the grill, or a combination of an annular gap and said apertures.

12. A barbecue grill having a smoke removal system for creating a smokeless cooking environment when in use, comprising:

a. an upper cooking portion for receiving and cooking food; and b. a lower smoke removal portion for sucking the cooking smoke therein, spraying the smoke with water from nozzles, collecting the water and particulate on a divider, and removing the water and particulate from the apparatus through a water-sealed hole defined by a portion of the divider.

13. The grill of claim 12 in which the lower smoke removal portion comprises a ventilator and piping for sucking the cooking smoke, a nozzle system for spraying water on the smoke, and water collection structure for collecting and re-supplying the water to the nozzles.

14. The grill of claim 12 in which the water-sealed hole is sealed by water that is provided to the nozzles by at least one water inlet pipe and which is then collected by the divider.

\* \* \* \* \*